(12) United States Patent
Wang et al.

(10) Patent No.: US 10,018,787 B1
(45) Date of Patent: Jul. 10, 2018

(54) MULTI-CHANNEL OPTICAL WAVELENGTH DIVISION MULTIPLEXING/DEMULTIPLEXING (WDM) ASSEMBLY AND METHODS

(71) Applicant: Avago Technologies General IP (Singapore) Pte. Ltd., Singapore (SG)

(72) Inventors: Tak Kui Wang, San Jose, CA (US); Chung-Yi Su, Fremont, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 15/476,344

(22) Filed: Mar. 31, 2017

(51) Int. Cl.
  *G02B 6/28* (2006.01)
  *G02B 6/293* (2006.01)
  *G02B 6/38* (2006.01)
  *G02B 6/32* (2006.01)

(52) U.S. Cl.
  CPC ....... *G02B 6/2938* (2013.01); *G02B 6/29364* (2013.01); *G02B 6/32* (2013.01); *G02B 6/3825* (2013.01); *G02B 6/3845* (2013.01); *G02B 6/3885* (2013.01); *G02B 6/3893* (2013.01)

(58) Field of Classification Search
  None
  See application file for complete search history.

(56) References Cited

U.S. PATENT DOCUMENTS

| | | | |
|---|---|---|---|
| 9,323,013 B2 | 4/2016 | Shao et al. | |
| 9,419,717 B2 | 8/2016 | Huang et al. | |
| 2004/0042710 A1* | 3/2004 | Margalit | G02B 6/29362 385/24 |
| 2013/0094864 A1* | 4/2013 | Duis | H04B 10/40 398/139 |

FOREIGN PATENT DOCUMENTS

WO  WO 2008006402 A1 *  1/2008  ......... G02B 6/29362

* cited by examiner

*Primary Examiner* — Sung Pak
(74) *Attorney, Agent, or Firm* — Sheridan Ross P.C.

(57) ABSTRACT

A wavelength division multiplexing and demultiplexing (WDM) assembly is provided that is also capable of performing bidirectional communications. The WDM assembly comprises a WDM module and an adapter for use with the WDM module. The adapter has first and second receptacles in front and back ends thereof, respectively, that are configured to mate with a multi-fiber (MF) connector and with the WDM module, respectively. The MF connector holds ends of M optical fibers and the WDM module has M lenses. The WDM module holds ends of N optical fibers, where N is equal to or greater than 2M. When the MF connector and the WDM module are mated with the first and second receptacles, respectively, the ends of the M optical fibers held in the MF connector are in optical alignment with M lenses, respectively, disposed in the WDM module.

23 Claims, 7 Drawing Sheets

US 10,018,787 B1

MULTI-CHANNEL OPTICAL WAVELENGTH DIVISION MULTIPLEXING/DEMULTIPLEXING (WDM) ASSEMBLY AND METHODS

FIELD OF THE INVENTION

The invention relates to optical communications. More particularly, the invention relates to a multi-channel optical wavelength division multiplexing and demultiplexing (WDM) module and methods.

BACKGROUND OF THE INVENTION

A variety of multi-channel optical communications modules exist for simultaneously transmitting and/or receiving multiple optical data signals over multiple respective optical channels. A Multi-channel optical transmitter module, as that term is used herein, denotes an optical communications module having multiple optical transmit channels for simultaneously transmitting multiple optical signals over one or more optical waveguides (e.g., optical fibers). A Multi-channel optical receiver module, as that term is used herein, denotes an optical communications module having multiple optical receive channels for simultaneously receiving multiple respective optical signals over one or more optical waveguides. A Multi-channel optical transceiver module, as that term is used herein, denotes an optical communications module having multiple optical transmit channels and multiple optical receive channels for simultaneously transmitting and receiving multiple optical signals over one or more optical waveguides.

In optical communications networks, optical communications modules are used to transmit and/or receive optical signals over optical fibers. Optical receiver modules are optical communications modules that receive optical signals, but do not transmit optical signals. Optical transmitter modules are optical communications modules that transmit optical signals, but do not receive optical signals. Optical transceiver modules are optical communication modules that transmit and receive optical signals.

An optical transmitter or transceiver module has a light source that is driven by a driver circuit to cause the light source to generate amplitude and/or phase and/or polarization modulated optical signals that represent data. The modulated optical signals are optically coupled onto an end of an optical fiber by an optics system of the module. The light source is typically a laser diode or light emitting diode (LED). The optics system typically includes one or more reflective (e.g., mirrors), filters, refractive (e.g., lenses) and/or diffractive (e.g., gratings) elements.

An optical receiver or transceiver module includes a photodetector (e.g., a p-doped-intrinsic-n-doped (PIN) diode) that detects an optical data signal passing out of an end of an optical fiber and converts the optical data signal into an electrical signal, which is then amplified and processed by electrical circuitry of the module to recover the data. An optics system of the module optically couples the optical data signals passing out of the end of the optical fiber onto the photodetector.

A switch box is a communications instrument that incorporates optical input/output (I/O) ports on a face of the instrument, typically either on the front side or the back side of the instrument. Typically, multiple transceivers, transmitters, and/or receivers along with the optical I/O ports are mounted on a panel either individually or grouped together with a bulkhead adaptor. The transceivers, transmitters, and/or receivers communicate with external instruments optically and with internal components, such as a switch integrated circuit (IC). In a data center, a large number of these switch boxes exist and communicate with each other through a large number of optical fibers. With increased data and bandwidth requirements, there is a high demand to increase the number of optical I/O channels in each of the switch boxes. There is also a corresponding demand to increase in the number of optical channels between the switch boxes.

In order to reduce the number of optical fibers that are required for communication between the switch boxes, and to reduce the area required on the panel for supporting the increased number of optical channels, WDM can be used. In a WDM system, multiple optical signals with different wavelengths are multiplexed together from the transmitter. The signals are transmitted through the optical fiber. A demultiplexer separates the signals on the receive side according to their different wavelengths, and then converts each of the different wavelengths back to electrical signal. An alternative way to increase the bandwidth of an optical link is to transmit and receive optical signals of different wavelengths over each optical fiber, which is commonly referred to as bidirectional (BiDi) communications. In a switch box that incorporates WDM functionality and has a large number of channels (e.g., 128 transmit channels and 128 receive channels), WDM modules are used that are typically separate from the optical transmitters, receivers and/or transceivers of the switch box. In some cases, the switch box has bulkheads of ports, each of which connects on one side with a first connector that holds first ends of a first set of optical fibers for communication with other switch boxes, and connects on the opposite side with a second connector that holds first ends of a second set of optical fibers. Second ends of the second set of optical fibers are mechanically and optically coupled with a first optical port of a WDM module. First ends of a third set of optical fibers are mechanically and optically coupled to a second optical port of the WDM module. Second ends of the third set of optical fibers are mechanically and optically coupled to one of the optical transmitter, receiver or transceiver modules.

In such systems, many WDM modules are needed in order to serve all of the optical transmitters, receivers or transceivers of the switching center. Organizing all of the optical fibers that are needed to interconnect the WDM modules with the connectors of the bulkhead and to interconnect the WDM modules with the optical transmitters, receivers or transceivers can be challenging. Current solutions for such systems tend to be bulky and unwieldy. In addition, the optical fibers require a significant amount of space, which leads to the system consuming more space and higher costs. There are also costs associated with the large number of optical fibers that are needed and with the mechanical and optical coupling elements or components that are needed to mechanically and optically couple the first ends of the second set of optical fibers with the connectors of the bulkhead.

A need exists for a wavelength division multiplexing and demultiplexing module that is compact, that reduces the number of optical fibers that are needed, that uses passive alignment devices and techniques, that can be manufactured cost effectively, and that can be relatively easily assembled.

WRITTEN DESCRIPTION

Figure 1A:
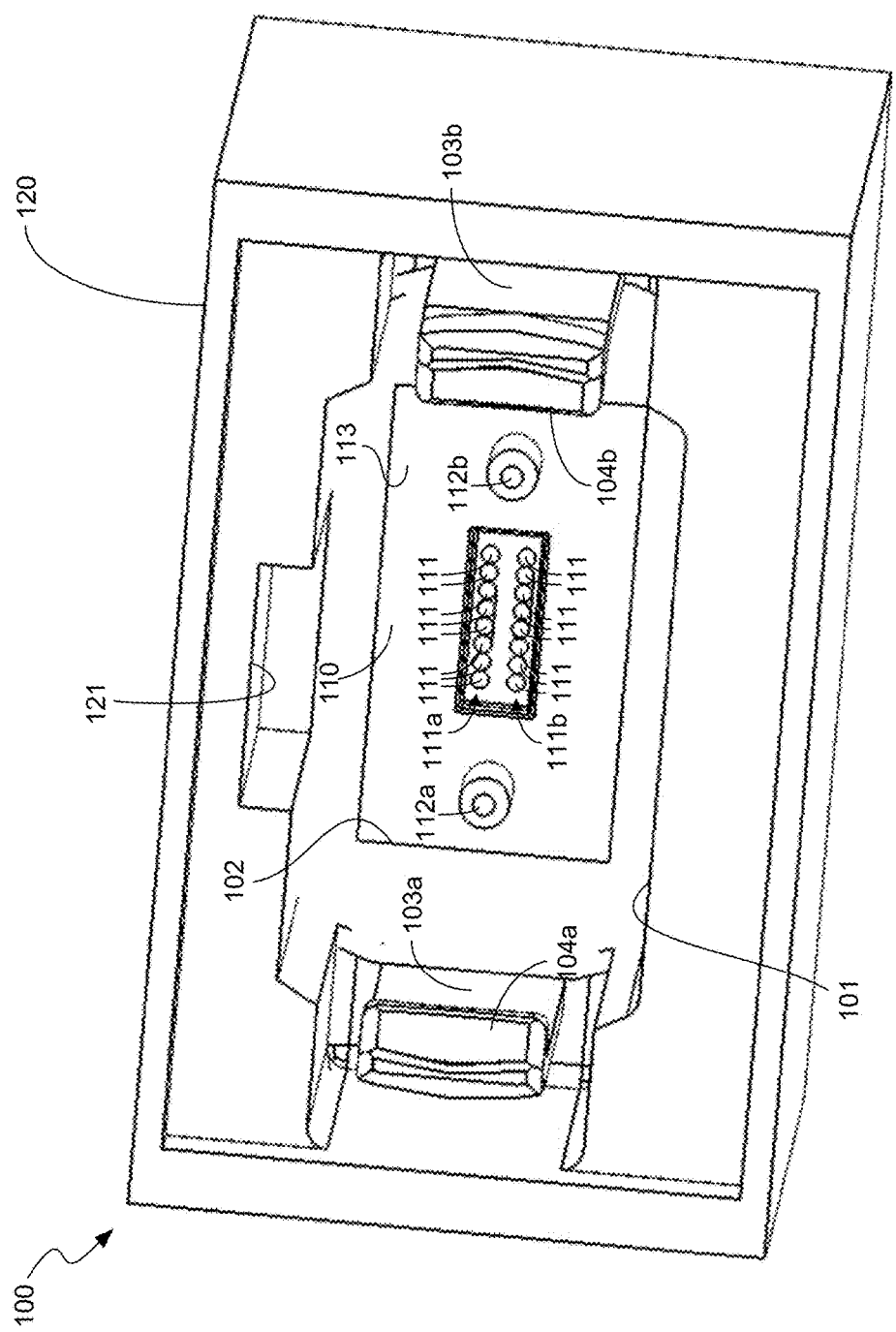
FIGS. 1A and 1B illustrate front and back perspective views, respectively, of a WDM assembly in accordance with a representative embodiment comprising an adapter and a WDM module mated with a receptacle of the adapter.

In accordance with representative, or exemplary, embodiments described herein, a wavelength division multiplexing and demultiplexing (WDM) assembly is provided comprising a WDM module and an adapter for use with the WDM module. The adapter has first and second receptacles in front and back ends thereof, respectively, that are configured to mate with a body of a multi-fiber (MF) connector and with a body of the WDM module, respectively. The MF connector has a multi-fiber ferrule that holds ends of M optical fibers in a front end of the MF connector. The WDM module has M lenses disposed in a front end thereof, where M is a positive integer that is greater than or equal to 1. The WDM module has a back end that is configured to mate with a fiber assembly that holds ends of N optical fibers, where N is equal to or greater than 2M. When the bodies of the MF connector and of the WDM module are mated with the first and second receptacles, respectively, the ends of the M optical fibers held in the MF connector are in optical alignment with the M lenses, respectively, disposed in the front end of the WDM module. The WDM module has an optics system that performs WDM to couple N optical signals passing out of the ends of the N optical fibers held in the fiber assembly into the ends of the M optical fibers held in the front end of the MF connector.

In accordance with a representative embodiment, the MF connector is an Multi-Fiber Push-On (MPO) connector and the first receptacle of the adapter has one or more passive alignment features therein that are configured to engage with one or more respective passive alignment features disposed on the body of the MPO connector to bring the MPO connector into alignment with the adapter and to interlock the MPO connector with the adapter. Likewise, the second receptacle of the adapter has one or more passive alignment features therein that are configured to engage one or more respective passive alignment features disposed on the body of the WDM module to bring the WDM module into alignment with the adapter and to interlock the WDM module with the adapter. In addition, in accordance with a representative embodiment, the front end of the WDM module has first and second pins protruding therefrom that are shaped, sized and positioned to mate with first and second complementarily shaped, sized and positioned holes, respectively, formed in the front end of the MPO connector when the WDM module and the MPO connector are mated with the first and second receptacles, respectively, of the adapter. Mating of the first and second pins with the first and second holes, respectively, brings the lenses disposed in the front end of the WDM module into precise optical alignment with the respective ends of the respective optical fibers disposed in the front end of the MPO connector.

The term "MPO connector," as that term is used herein, denotes a multi-optical fiber connector that is defined by International Electrotechnical Commission (IEC)-61754-7 "Fibre optic interconnecting devices and passive components—Fibre optic connector interfaces—Part 7: Type MPO connector family"; and Telecommunications Industry Association (TIA)-604-5-D, "Fiber Optic Connector Intermateability Standard, Type MPO." It should be noted, however, that the MF connector that is used with the adapter and with the WDM module is not limited to being an MPO connector, but can be any suitable MF connector and can have any suitable form factor. Because of the ubiquitous nature of the MPO connector, it will be advantageous in many applications for the WDM module and the adapter to be configured for use with a standard MPO connector. The term "MF connector," as that term is used herein, denotes any multi-optical fiber connector that is configured for use with the adapter and with the WDM module, including, but not limited to, an MPO connector.

In the following detailed description, for purposes of explanation and not limitation, exemplary, or representative, embodiments disclosing specific details are set forth in order to provide a thorough understanding of the inventive principles and concepts. However, it will be apparent to one of ordinary skill in the art having the benefit of the present disclosure that other embodiments according to the present teachings that are not explicitly described or shown herein are within the scope of the appended claims. Moreover, descriptions of well-known apparatuses and methods may be omitted so as not to obscure the description of the exemplary embodiments. Such methods and apparatuses are clearly within the scope of the present teachings, as will be understood by those of skill in the art.

It should also be understood that the word "example," as used herein, is intended to be non-exclusionary and non-limiting in nature. More particularly, the word "exemplary," as used herein, indicates one among several examples, and it should be understood that no undue emphasis or preference is being directed to the particular example being described. It should also be understood that the word "exemplary," as used herein, is intended to be non-exclusionary and non-limiting in nature.

The terminology used herein is for purposes of describing particular embodiments only, and is not intended to be limiting. The defined terms are in addition to the technical, scientific, or ordinary meanings of the defined terms as commonly understood and accepted in the relevant context.

The terms "a," "an" and "the" include both singular and plural referents, unless the context clearly dictates otherwise. Thus, for example, "a device" includes one device and plural devices. The term "substantially" means to within limits or degrees acceptable to those of skill in the art. For example, the term "substantially parallel to" means that a structure or device may not be made perfectly parallel to some other structure or device due to tolerances or imperfections in the process by which the structures or devices are made. The term "approximately" means to within an acceptable limit or amount to one of ordinary skill in the art. Where a first device is said to be directly connected or directly coupled to a second device, this encompasses examples where the two devices are connected together without any intervening devices other than bonding material or devices. Where a first device is said to be coupled to a second device, this encompasses examples where the two devices are directly connected together without any intervening devices other than bonding material or devices and examples where the first and second devices are connected to one another via one or more intervening devices.

Exemplary, or representative, embodiments will now be described with reference to the figures, in which like reference numerals represent like components, elements or features. It should be noted that features, elements or components in the figures are not intended to be drawn to scale, emphasis being placed instead on demonstrating inventive principles and concepts.

Figure 1B:
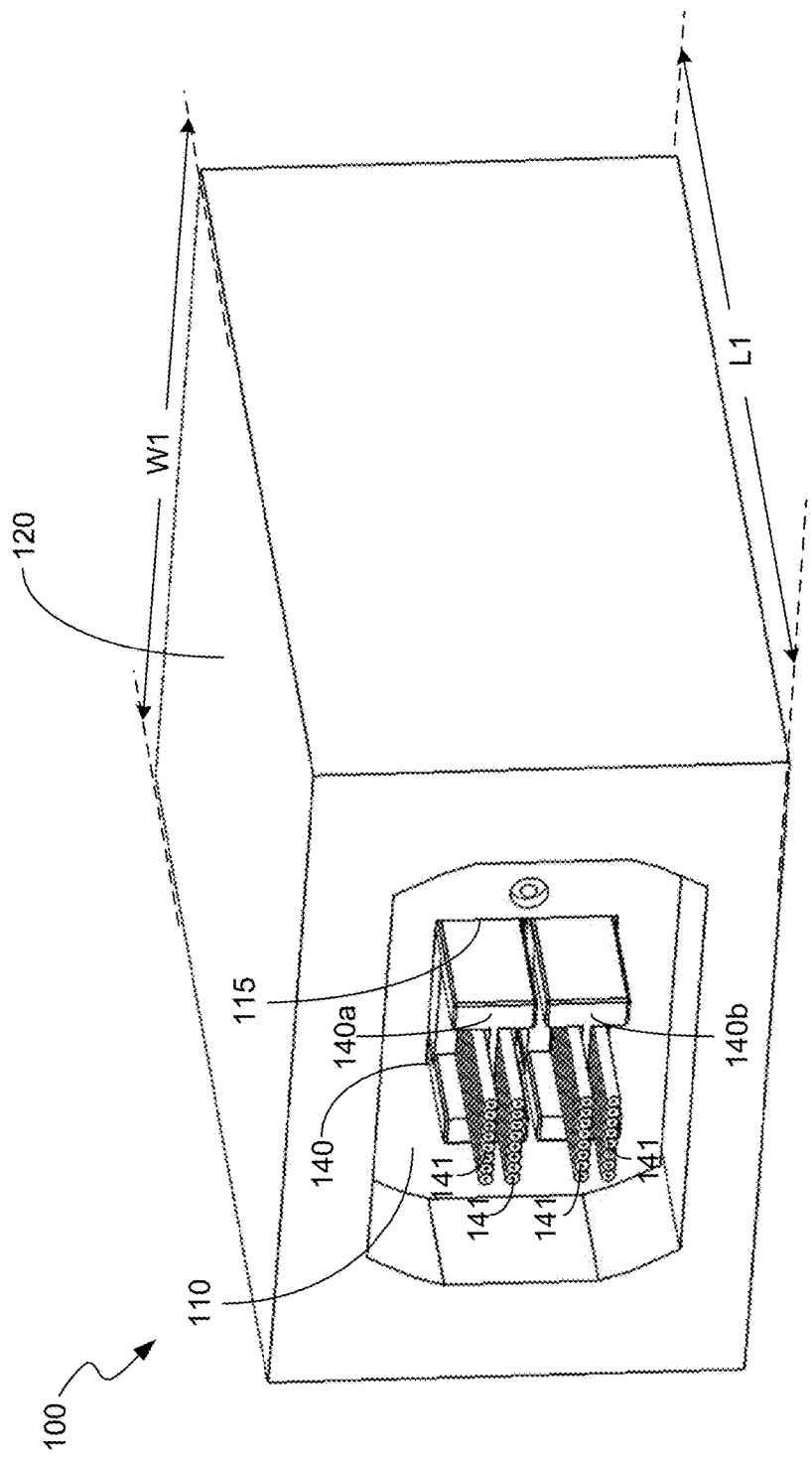
Figure 2:
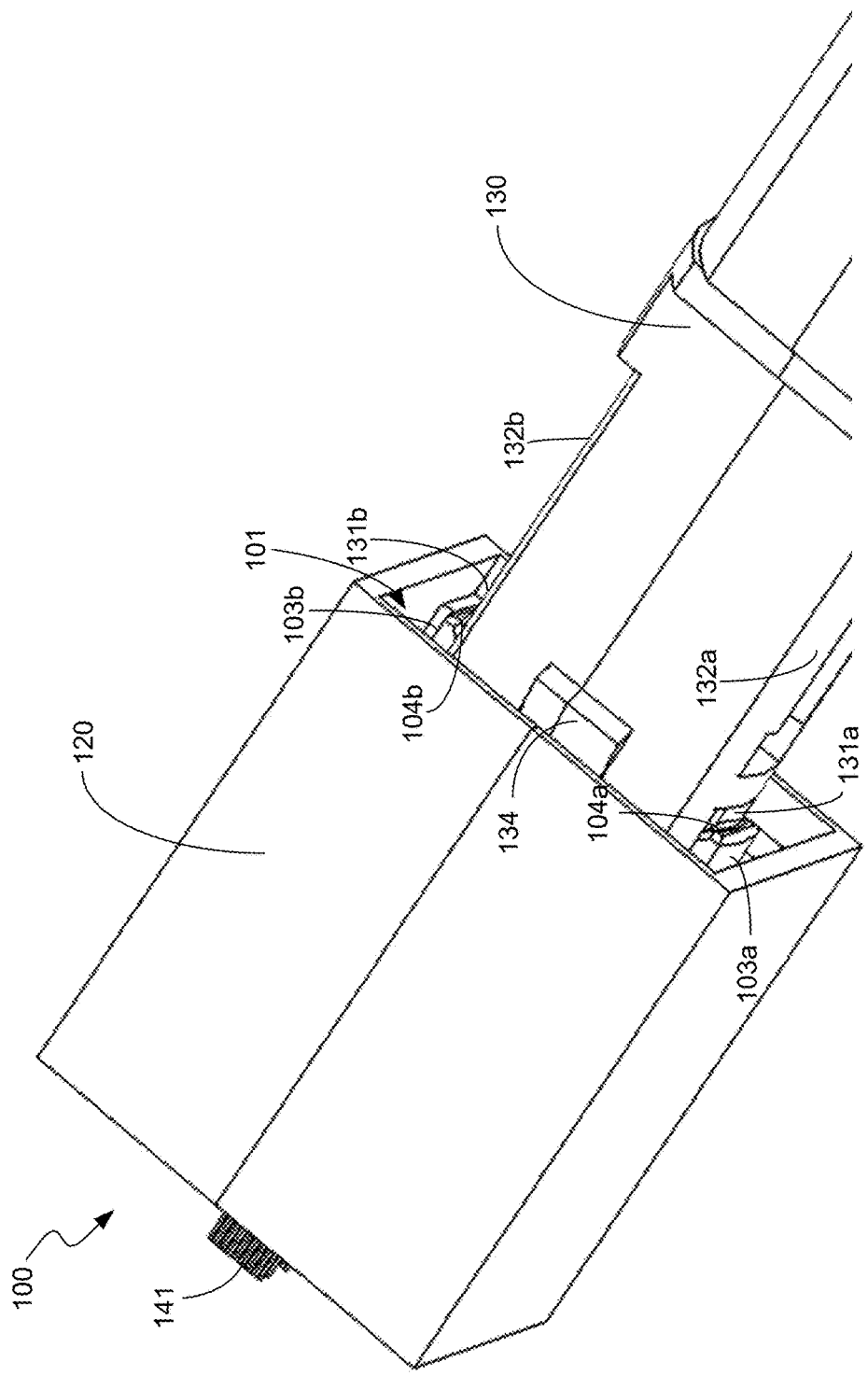
FIG. 2 illustrates a top perspective view of the WDM assembly shown in FIGS. 1A and 1B having an MF connector mated with a receptacle of the adapter.

FIGS. 1A and 1B illustrate front and back perspective views, respectively, of a WDM assembly 100 comprising an adapter 120 and a WDM module 110 mated with a second receptacle 102 of the adapter 120. The MF connector is not shown in FIGS. 1A and 1B for clarity. FIG. 2 illustrates a top perspective view of the WDM assembly 100 having an MF connector 130, which in this example is an MPO connector, mated with a first receptacle 101 of the adapter 120. In accordance with the representative embodiment depicted in FIGS. 1A-2, the first receptacle 101 of the adapter 120 has first and second passive alignment features 103a and 103b, respectively, disposed therein for engaging first and second passive alignment features 131a and 131b, respectively (FIG. 2), of the MF connector 130 (FIG. 2) when it is engaged with, i.e., mated with, the first receptacle 101 of the adapter 120.

In accordance with this representative embodiment, the first and second passive alignment features 103a and 103b, respectively, of the adapter 120 are first and second flexible arms having first and second inwardly-projecting latch features 104a and 104b thereon, respectively, that abut first and second outer side walls 132a and 132b, respectively (FIG. 2), of the MF connector 130 (FIG. 2) as it is inserted into the first receptacle 101. The abutment between the first and second outer side walls 132a and 132b, respectively, of the MF connector 130 causes the first and second flexible arms 103a and 103b, respectively, to flex outwardly to allow the MF connector 130 to be mated with the first receptacle 101. When the MF connector 130 is fully mated with the first receptacle 101, the first and second inwardly-projecting latch features 104a and 104b, respectively, engage first and second catches 131a and 131b (FIG. 2), respectively, formed in the first and second outer side walls 132a and 132b, respectively, of the MF connector 130 (FIG. 2) to secure, or interlock, the MF connector 130 with the first receptacle 101. In accordance with this representative embodiment, the adapter 120 also has a keyway 121 (FIG. 1A) formed in an inner upper surface thereof that mates with a key 134 (FIG. 2) disposed on an upper outer surface of the MF connector 130 when the MF connector 130 is properly oriented relative to the adapter 130 and inserted into the first receptacle 101.

The front end of the WDM module 110 has P rows of lenses 111 disposed therein, where P is a positive integer that is equal to or greater than one. The MF connector 130 has P rows of optical fiber ends disposed in the front end thereof, which are aligned with the respective lenses 111 when the MF connector 130 and the WDM module 110 are mated with the first and second receptacles 101 and 102, respectively, of the adapter 120. In accordance with the representative embodiments described herein, M=16, P=2 and N=32, i.e., the front end of the WDM module 110 has 16 lenses 111 disposed therein that are arrayed in first and second parallel rows 111a and 111b, respectively, of eight lenses 111 each and the WDM module 110 holds ends of 32 optical fibers 141 (FIG. 1B). Also shown in FIG. 1A are first and second pins 112a and 112b, respectively, of the WDM module 110 that protrude into the first receptacle 101 from the front end of the WDM module 110 substantially normal to a front face 113 of the WDM module 110. The first and second pins 112a and 112b, respectively, are shaped, sized and positioned to mate with first and second complementarily shaped, sized and positioned holes, respectively (not shown), formed in the front end of the MF connector 130 (FIG. 2) when the MF connector 130 and the WDM module 110 are mated with the first and second receptacles 101 and 102, respectively, of the adapter 120. The mating of the first and second pins 112a and 112b, respectively, with the first and second holes, respectively, brings the lenses 111 into precise optical alignment with respective ends of the respective optical fibers (not shown) disposed in the front end of the MF connector 130.

As shown in FIG. 1B, a back end of the WDM module 110 has a third receptacle 115 formed therein that is configured to mate with a fiber assembly 140 that holds ends of N optical fibers 141 in four rows that are substantially parallel to one another, where N is a positive integer that is equal to or greater than 2M. While the representative embodiment depicts the N optical fibers being held in four rows, the N optical fibers are held in Q rows in the fiber assembly 140, where Q is equal to or greater 2P. As indicated above, P corresponds to the number of rows of lenses 111 and the number of rows in which the ends of the optical fibers held in the MF connector 130 are arranged. Therefore, the number Q of rows in which the optical fibers 141 are arranged in is equal to or greater than twice the number of rows, P, in which the ends of the optical fibers are arranged in the MF connector 130. As indicated above, in accordance with the representative embodiments described herein, Q=4=2P, but in other embodiments not explicitly described herein, Q is greater than 2P, as will be described below in more detail.

In accordance with this representative embodiment, the fiber assembly 140 comprises first and second optical connectors 140a and 140b, respectively, each of which holds ends of M optical fibers in two rows that are substantially parallel to one another. The manner in which optical signals are coupled by the WDM module 110 between the lenses 111 disposed in the front end of the WDM module 110 and the ends of the optical fibers 141 held in the fiber assembly 140 is described below in detail with reference to FIG. 4.

In accordance with a representative embodiment, the WDM assembly 100 is very compact. With reference to FIG. 1B, in accordance with this embodiment, the WDM assembly 100 has a length, L1, that is less than about 20 millimeters (mm) and is typically about 17.50 mm. In accordance with this embodiment, the adapter 120 has a width, W1, that is less than about 16 mm and is typically about 14.34 mm. In accordance with this embodiment, the fiber assembly 140 holds the ends of the fibers 141 in four substantially parallel rows, each of which has eight fibers 141. Thus, in accordance with this embodiment, the MF connector 130 holds the ends of optical fibers in two substantially parallel rows, each having eight optical fibers (not shown).

Figure 3A:
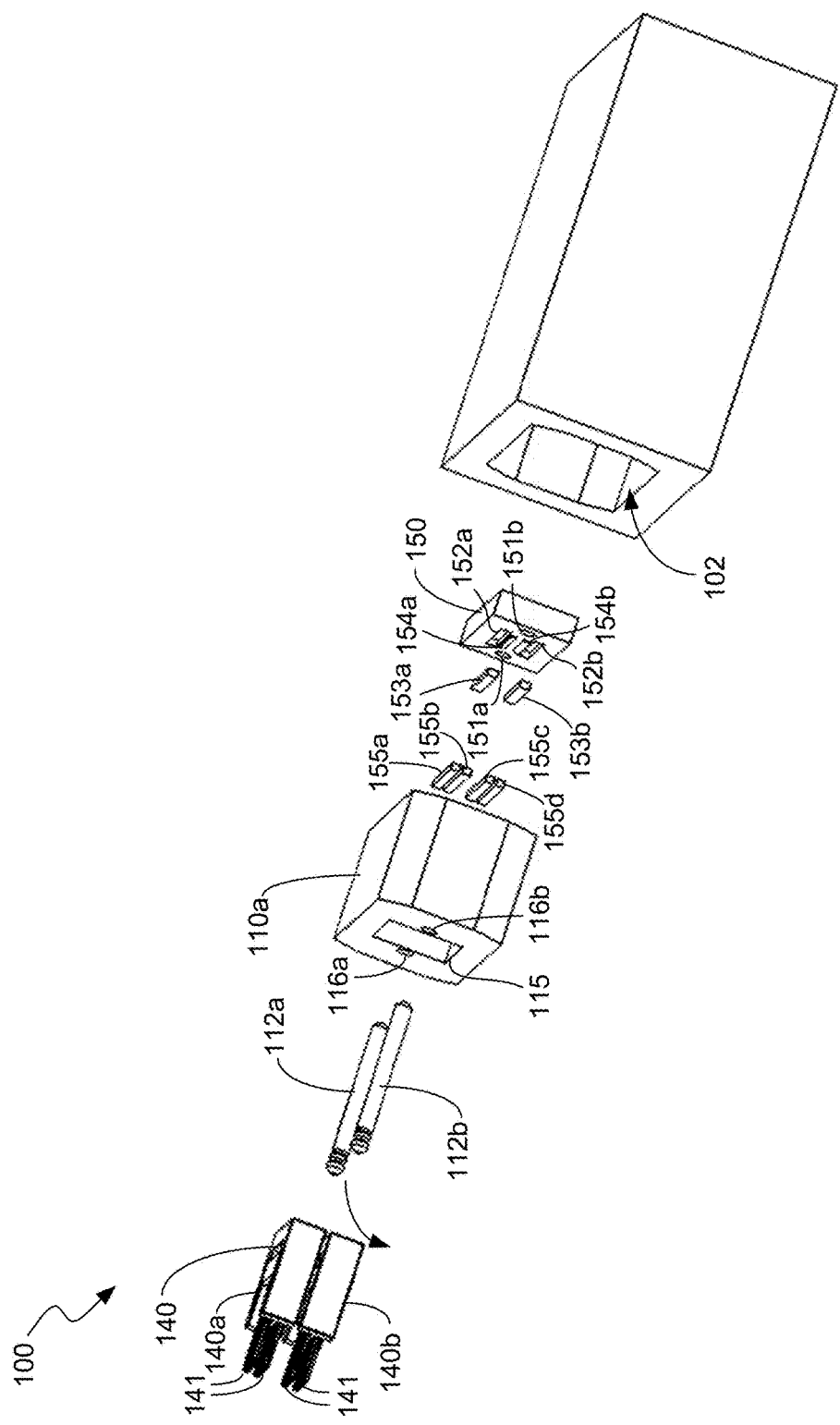
FIGS. 3A and 3B illustrate back and front exploded views, respectively, of the WDM assembly shown in FIG. 1A in accordance with a representative embodiment.
Figure 3B:
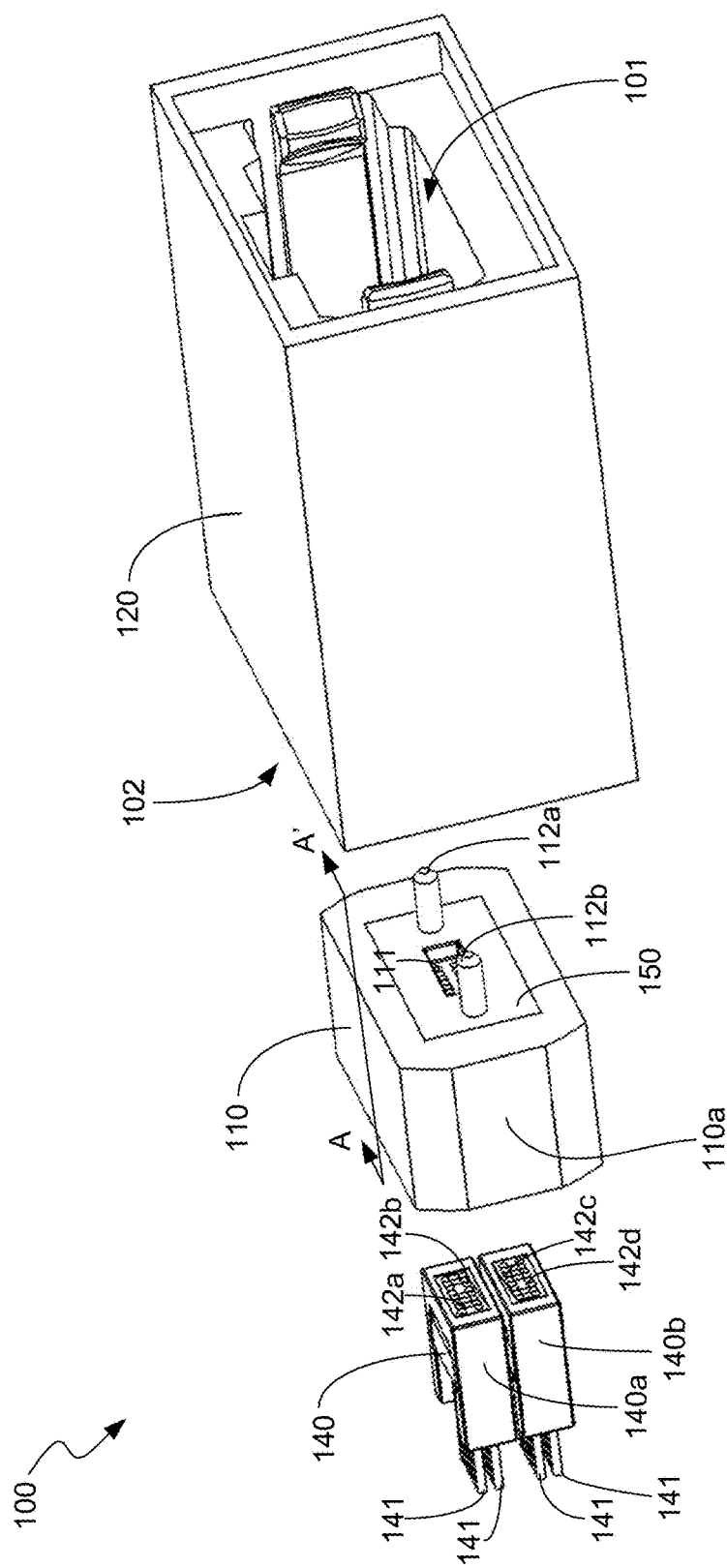

FIGS. 3A and 3B illustrate back and front exploded perspective views, respectively, of the WDM assembly 100 shown in FIG. 1A in accordance with a representative embodiment. In FIG. 3A, the WDM module 110 is also shown exploded, whereas the WDM module 110 is shown assembled in FIG. 3B. The WDM module 110 includes a module body 110a having the third receptacle 115 formed therein and having first and second thru holes 116a and 116b, respectively, formed therein through which the first and second pins 112a and 112b, respectively, pass. A lens assembly 150 of the WDM module 110 has first and second thru holes 151a and 151b, respectively, formed therein through which the which the first and second pins 112a and 112b, respectively, pass, and first and second recessed areas 152a and 152b, respectively, formed therein into which first and second mirrors 153a and 153b, respectively, of the lens assembly 150 are seated and secured. The lens assembly 150 also has first and second prism surfaces 154a and 154b, respectively.

In accordance with this representative embodiment, the WDM module 110 has first, second, third and fourth filter blocks 155a, 155b, 155c and 155d, respectively, that mount to inner surfaces (not shown) of the module body 110a. The lens assembly 150 also mounts to inner surfaces (not shown) of the module body 110a. When the filter blocks 155a-155d and the lens assembly 150 are mounted on the module body 110a and the fiber assembly 140 is mated with the third receptacle 115 of the WDM module 110, the filter blocks 155a-155d, the lens assembly 150 and the ends of the optical fibers 141 are in optical alignment with one another. The manner in which this optical alignment is achieved and the corresponding optical pathways will be described below in detail with reference to FIG. 4.

With reference to FIG. 3B, the assembled lens assembly 150 is visible prior to the WDM module 110 being mated with the second receptacle 102 of the adapter 120. Also visible in FIG. 3B are first and second rows of lenses 142a and 142b, respectively, disposed in a front end of the first optical connector 140a of the fiber assembly 140 and third and fourth rows of lenses 142c and 142d, respectively, disposed in a front end of the second optical connector 140b of the fiber assembly 140. The first through fourth rows of lenses 142a-142d, respectively, are substantially parallel to one another when the fiber assembly 140 is secured within the third receptacle 115 of the WDM module 110.

Figure 4:
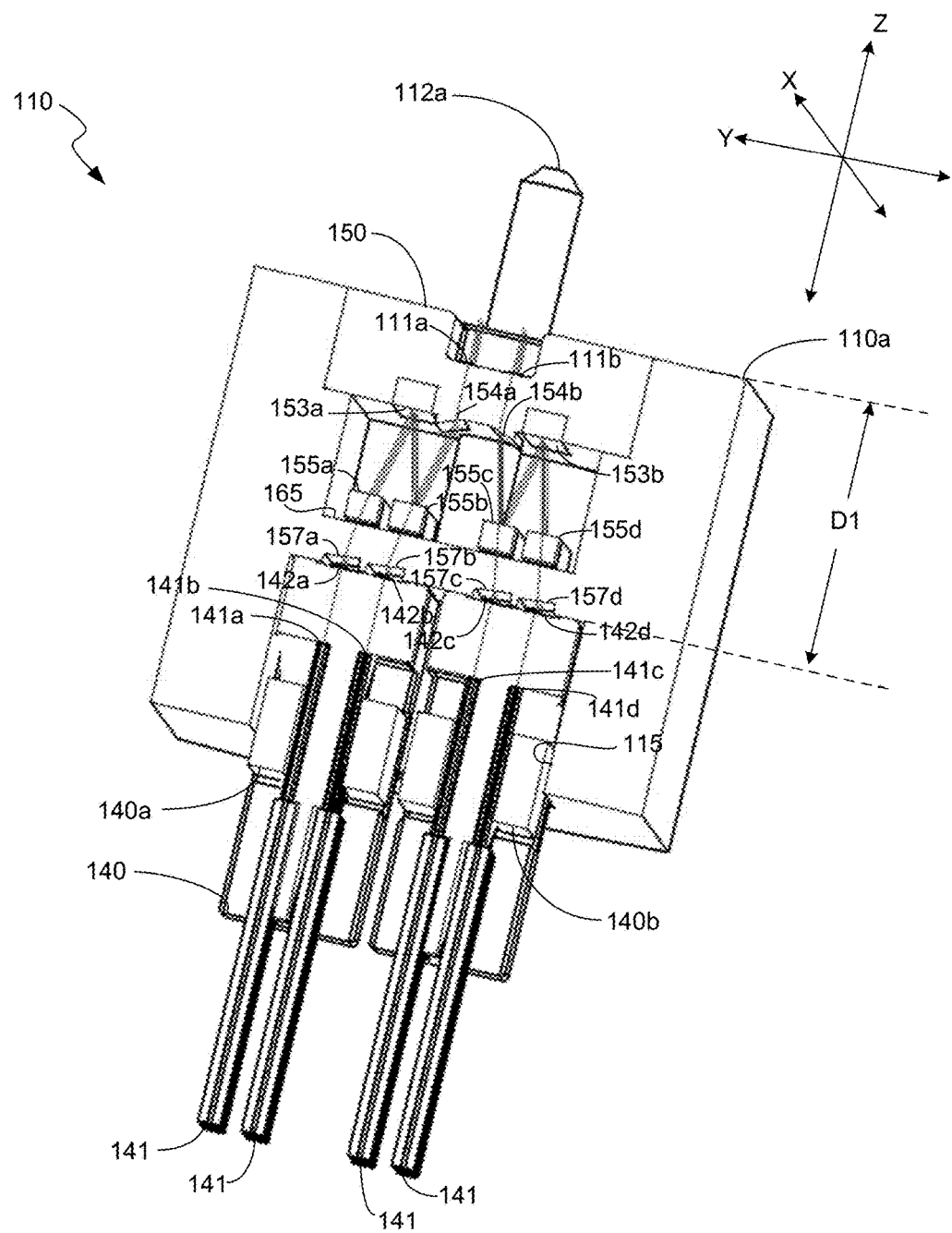
FIG. 4 illustrates a cross-sectional perspective view of the assembled WDM module shown in FIG. 3B taken along line A-A' shown in FIG. 3B and having the fiber assembly mated with a receptacle of the WDM module.

FIG. 4 illustrates a cross-sectional perspective view of the assembled WDM module 110 shown in FIG. 3B taken along line A-A' shown in FIG. 3B and having the fiber assembly 140 mated with the third receptacle 115 (FIG. 3A) of the WDM module 110. The module body 110a and the fiber assembly 140 are made of a material that is transmissive to the wavelengths of light that are being operated on by the WDM module 110. The WDM module 110 is configured to operate on S different wavelengths of light, where S is a positive integer that is greater than or equal to two. In accordance with this representative embodiment, the WDM module 110 operates on two different wavelengths of light, λ1 and λ2, i.e., S=2. It should be noted, however, that S may be any positive integer that is greater than or equal to two. In accordance with this representative embodiment, the first optical connector 140a of the fiber assembly 140 holds ends 141a and 141b of M optical fibers 141 in two respective substantially parallel rows of M/2 optical fibers in optical alignment with the respective lenses 142a and 142b of the first optical connector 140a. Likewise, the second optical connector 140b of the fiber assembly 140 holds ends 141c and 141d of M optical fibers 141 in two respective substantially parallel rows of M/2 optical fibers in optical alignment with the respective lenses 142c and 142d of the second optical connector 140b.

In accordance with this representative embodiment, the module body 110a has third, fourth, fifth and sixth prism surfaces 157a, 157b, 157c and 157d, respectively, formed therein. The first and second prism surfaces 154a and 154b, respectively, comprise a first set of prism surfaces of the module body 110a. The third through sixth prism surfaces 157a through 157d, respectively, comprise a second set of prism surfaces of the module body 110a. As will be described below in more detail, the first and second sets of prism surfaces 154a-154b and 157a-157d, respectively, are configured to tilt the optical pathways passing through them by first and second predetermined tilt angles, respectively.

The combination of the lens assembly 150, the filter blocks 155a-155d, the first and second prism surfaces 154a and 154b, respectively, and the third through sixth prism surfaces 157a-157d, respectively, comprise the optics system of the WDM module 110. The WDM module 110 is capable of performing wavelength division multiplexing and demultiplexing and/or to achieve bidirectional communications. The term "bidirectional communications," as that term is used herein, means simultaneous transmitting and receiving of optical signals over at least one of the optical fibers 141 using at least T different wavelengths, where T is a positive integer that is greater than or equal to two. Each of these modes of operation will be described in turn.

The WDM module 110 performs wavelength division multiplexing as follows. Optical signals to be transmitted by the WDM module 110 propagate along the optical fibers 141 toward the lenses 142a-142d of the fiber assembly 140. The lenses 142a-142d collimate the optical signals and direct the collimated light beams onto the third through sixth prism surfaces 157a-157d, respectively, which tilt the collimated light beams by the second predetermined tilt angle and direct the tilted collimated light beams toward the filter blocks 155a-155d, respectively.

It will be assumed, for exemplary purposes, that the optical signals passing out of the fiber ends 141a and 141d are of wavelength λ1 and that the optical signals passing out of the fiber ends 141b and 141c are of wavelength λ2. The tilted collimated light beams of wavelength λ1 pass through the first filter block 155a, which is transmissive to wavelength λ1, and are reflected by the first mirror 153a onto the second filter block 155b, which is reflective to light of wavelength λ1 and transmissive to light of wavelength λ2. The second filter block 155b reflects the collimated light beams of wavelength λ1 onto the first prism surface 154a, which tilts the collimated light beams by the first predetermined tilt angle to direct them onto the respective lenses of the first row of lenses 111a. As indicated above, the lenses of the first row of lenses 111a are in optical alignment with the ends of a first row of optical fibers held in the MF connector 130 (FIG. 2), and therefore the collimated light beams are coupled by the lenses of the first row of lenses 111a onto the ends of respective optical fibers (not shown) held in the MF connector 130.

The light beams of wavelength λ2 passing out of the ends 141b of the optical fibers 141 are collimated by the lenses 142b of the fiber assembly 140, tilted by fourth prism surface 157b and directed onto the second filter block 155b. The second filter block 155b passes the tilted collimated light beams of wavelength λ2 so that they are incident on the first prism surface 154a. The first prism surface 154a tilts the collimated light beams of wavelength λ2 by the first predetermined tilt angle and directs the collimated light beams of wavelength λ2 onto the respective lenses of the first row of lenses 111a, which couples the collimated light beams onto the ends of the first row of optical fibers (not shown) held in the MF connector 130 (FIG. 2).

The optical signals of wavelength λ1 passing out of the ends 141d of the optical fibers 141 are tilted by the sixth prism surface 157d and are incident on the fourth filter block 155d, which is transmissive to light of wavelength λ1. The collimated light beams of wavelength λ1 pass through the fourth filter block 155d and are reflected by the second mirror 153b onto the third filter block 155c, which is reflective to light of wavelength λ1 and transmissive to light of wavelength λ2. The third filter block 155c reflects the collimated light beams of wavelength λ1 onto the second prism surface 154b, which tilts the collimated light beams by the first predetermined tilt angle to direct them onto the respective lenses of the second row of lenses 111b. As indicated above, the lenses of the second row of lenses 111b are in optical alignment with the ends of a second row of optical fibers held in the MF connector 130 (FIG. 2), and therefore the collimated light beams are coupled by the lenses of the second row of lenses 111b onto the ends of respective optical fibers (not shown) held in the MF connector 130.

The light beams of wavelength λ2 passing out of the ends 141c of the optical fibers 141 are collimated by the lenses 142c of the fiber assembly 140, tilted by fifth prism surface 157c and directed onto the third filter block 155c. The third filter block 155c passes the tilted collimated light beams of wavelength λ2 so that they are incident on the second prism surface 154b. The second prism surface 154b tilts the collimated light beams of wavelength λ2 by the first predetermined tilt angle and directs the collimated light beams of wavelength λ2 onto the respective lenses of the second row of lenses 111b, which couples the collimated light beams onto the ends of the second row of optical fibers (not shown) held in the MF connector 130 (FIG. 2).

In the transmit direction, i.e., when performing wavelength division multiplexing, the second set of prism surfaces 157a-157d ensures that light of wavelengths λ1 and λ2 that is back reflected will not be coupled back onto the ends 141a-141d, respectively, of the optical fibers 141, thereby preventing back-reflected light from being coupled back onto the respective light sources (not shown) that generated the optical signals. In the transmit direction, the first set of prism surfaces 154a-154b reverse the tilt provided by the second set of prism surfaces 157a-157d.

The WDM module 110 performs wavelength division demultiplexing as follows. Light beams of wavelength λ1 and λ2 passing out of the ends of the first row of optical fibers (not shown) held in the MF connector 130 (FIG. 2) are received and collimated by the respective lenses of the first row of lenses 111a of the lens assembly 150. The collimated light beams of wavelengths λ1 and λ2 are directed by the lenses of the first row of lenses 111a onto the first prism surface 154a, which tilts the collimated light beams by the first predetermined tilt angle and directs the tilted collimated light beams onto the second filter block 155b.

The second filter block 155b passes the tilted collimated light beams of wavelength λ2 through to the fourth prism surface 157b and reflects the tilted collimated light beams of wavelength λ1 onto the first mirror 153a. The first mirror 153a reflects the collimated light beams of wavelength λ1 onto the first filter block 155a, which passes the collimated light beams of wavelength λ1 to the third prism surface 157a. The third prism surface 157a tilts the collimated light beams by the second predetermined tilt angle and directs the tilted collimated light beams of wavelength λ1 onto the lenses 142a of the lens assembly 150. The lenses 142a focus the light beams of wavelength λ1 onto the ends 141a of the optical fibers 141.

The collimated light beams of wavelength λ2 that are passed by the second filter block 155b are tilted by the fourth prism surface 157b by the second predetermined tilt angle and directed onto the respective lenses 142b of the lens assembly 150. The lenses 142b focus the respective light beams onto the ends 141b of the optical fibers 141.

Light beams of wavelength λ1 and λ2 passing out of the ends of the second row of optical fibers (not shown) held in the MF connector 130 (FIG. 2) are received and collimated by the respective lenses of the second row of lenses 111b of the lens assembly 150. The collimated light beams of wavelengths λ1 and λ2 are directed by the lenses of the second row of lenses 111b onto the second prism surface 154b, which tilts the collimated light beams by the first predetermined tilt angle and directs the tilted collimated light beams onto the third filter block 155c.

The third filter block 155c passes the tilted collimated light beams of wavelength λ2 through to the fifth prism surface 157c and reflects the tilted collimated light beams of wavelength λ1 onto the second mirror 153b. The second mirror 153b reflects the collimated light beams of wavelength λ1 onto the fourth filter block 155d, which passes the collimated light beams of wavelength λ1 to the sixth prism surface 157d. The sixth prism surface 157d tilts the collimated light beams of wavelength λ1 by the second predetermined tilt angle and directs the tilted collimated light beams of wavelength λ1 onto the lenses 142d of the lens assembly 150. The lenses 142d focus the light beams of wavelength λ1 onto the ends 141d of the optical fibers 141.

The collimated light beams of wavelength λ2 that are passed by the third filter block 155c are tilted by the fifth prism surface 157c by the second predetermined tilt angle and directed onto the respective lenses 142c of the lens assembly 150. The lenses 142c focus the respective light beams onto the ends 141c of the optical fibers 141.

Bidirectional communications may be performed as follows. For exemplary purposes, it will be assumed that optical signals are being transmitted from and received in the WDM module 110 using wavelengths λ1 and λ2, respectively. Thus, optical signals being transmitted using wavelength λ1 are passing out of the ends 141a of the optical fibers 141 and the optical signals being received using wavelength λ2 are being coupled onto the ends 141b of the optical fibers 141. In the transmit direction, the light beams of wavelength λ1 passing out of the ends 141a of the optical fibers 141 are collimated by lenses 142a, tilted by third prism surface 157a, pass through the first filter block 155a, are reflected by the first mirror 153a onto the second filter block 155b, reflected by the second filter block 155b, tilted by the first prism surface 154a, and coupled by the lenses of the first row of lenses 111a onto the ends of the respective optical fibers (not shown) of the first row held in the MF connector 130.

In the receive direction, the light beams of wavelength λ2 passing out of the ends of the optical fibers of the first row held in the MF connector 130 are collimated by the lenses of the first row 111a, are tilted by first prism surface 154a, pass through the second filter block 155b, are tilted by the fourth prism surface 157b, and coupled by the lenses 142b onto the ends 141b of the optical fibers 141.

While the bidirectional operations have only been described with reference to transmitting and receiving light of wavelengths λ1 and λ2, respectively, the same type of operations may be performed for light of wavelength λ1 passing out of the ends 141d of the optical fibers 141 and light of wavelength λ2 passing out of the ends of the optical fibers held in the second row in the MF connector 130. In the interest of brevity, bidirectional operations along these optical pathways will not be described herein.

It should be noted that although the multiplexing operations have been described with reference to all channels transmitting using wavelengths λ1 and λ2, one or more other wavelengths could be used to transmit and receive optical signals. For example, optical signals of wavelengths λ1 and λ2 passing out of the ends 141a and 141b, respectively, of the optical fibers 141 may be transmitted while optical signals of wavelengths λ3 and λ4 passing out of the ends of the optical fibers held in the second row in the MF connector 130 are received. As yet another alternative, optical signals of wavelengths λ1 and λ4 passing out of the ends 141a and 141d, respectively, of the optical fibers 141 may be transmitted while optical signals of wavelengths λ2 and λ3 passing out of the ends of the optical fibers held in the first and second rows, respectively, in the MF connector 130 are received. Various other alternatives are also possible, such as performing bidirectional operations using wavelengths λ1 and λ2 in the manner described above while transmitting using wavelength λ4 and receiving using wavelength λ3, or vice versa. Thus, the WDM module 110 is extremely versatile.

In the above description of exemplary, or representative, embodiments, multiplexing operations have been described in terms of combining two optical signals of two respective wavelengths such that each lens 111 couples an optical signal of two wavelengths into a respective optical fiber end held in the MF connector 130. It should be noted, however, that the number T of wavelengths used and the number of optical signals that are combined can be increased by adding more fibers (i.e., increasing the value of N) and increasing the number of filter blocks 155 that are used in the WDM module 110. Because persons of skill in the art will understand the manner in which such modifications may be made, in view of the description provided herein, such modifications are not described herein in further detail in the interest of brevity.

The demultiplexing operations have been described above with reference to each lens 111 receiving an optical signal having two wavelengths from a respective end of a respective optical fiber held in the MF connector 130, separating each optical signal into two optical signals of two respective wavelengths, and coupling the two optical signals of two respective wavelengths into ends 141a and 141b or into the ends 141c and 141d of the optical fibers 141. It should be noted, however, that the number of optical signals and the number of respective wavelengths that are separated during the demultiplexing operations and coupled into the ends 141a-141d of the optical fibers 141 can be increased by increasing the number N of optical fibers and the number of filter blocks 155 that are used in the WDM module 110. Because persons of skill in the art will understand the manner in which such modifications may be made, in view of the description provided herein, such modifications are not described herein in further detail in the interest of brevity.

Similarly, although bidirectional communications have been described with reference to using a first wavelength to transmit and a second wavelength to receive over each channel, the number of wavelengths that are simultaneously transmitted and received over each channel can be increased by increasing the number of optical fibers 141 and filter blocks 155 that are used in the WDM module 110. Because persons of skill in the art will understand the manner in which such modifications may be made, in view of the description provided herein, such modifications are not described herein in further detail in the interest of brevity.

Another advantage of the WDM module 110 is due to its compact in-line configuration. The term "in-line" means that the first and second rows of lenses 111a and 111b, respectively, are coaxial with the ends of the optical fibers held in the ferrule (not shown) of the MF connector 130 in first and second substantially parallel rows. The in-line configuration is compact in that the distance, D1, between the ends of the optical fibers held in the ferrule of the MF connector 130 and the ends 141a-141d of the optical fibers 141 held in the fiber assembly 140 is very short. In this representative embodiment, the distance D1 is less than about 3 mm. The ferrule (not shown) of the MF connector 130 (FIG. 2) in which the ends of the optical fibers are held abuts the front face of the lens assembly 150 when the MF connector and the WDM module 110 are mated with the first and second receptacles 101 and 102, respectively, of the adapter 120. Therefore, the distance D1 is approximately equal to the distance between the ends of the optical fibers held in the ferrule of the MF connector 130 and the ends 141a-141d of the optical fibers 141 held in the fiber assembly 140. A distance of less than about 3.0 mm is very short for an in-line configuration capable of performing WDM and/or bidirectional operations.

Examples of some of the dimensions of some of the components of the WDM module 110 and distances between some of the features formed in the module body 110a, in accordance with this representative embodiment, are as follows. The distance in the Z-direction of the X, Y Z Cartesian coordinate system from the first and second rows of lenses 111a and 111b, respectively, to the first and second prism surfaces 154a and 154b, respectively, is about 0.68 mm. The filter blocks 155a-155d are about 0.3 mm thick in the Z-dimension. The distance in the Z-direction from the bottom surfaces of the first and second mirrors, 153a and 153b, respectively, to the top surfaces of the filter blocks 155a-155d is about 1.0 mm. There is about a 50 micrometer (micron) air gap between the inner surface 165 of the module body 110a and the bottom surface of the filter blocks 155a-155d. The distance in the Z-direction from the top surfaces of the third through sixth prism surfaces 157a-157d, respectively, and the inner surface 165 is about 0.39 mm. The distance in the Z-direction from the apexes of the lenses 142a-142d to the ends 141a-141d, respectively, of the optical fibers 141 is about 220 microns.

Figure 5:
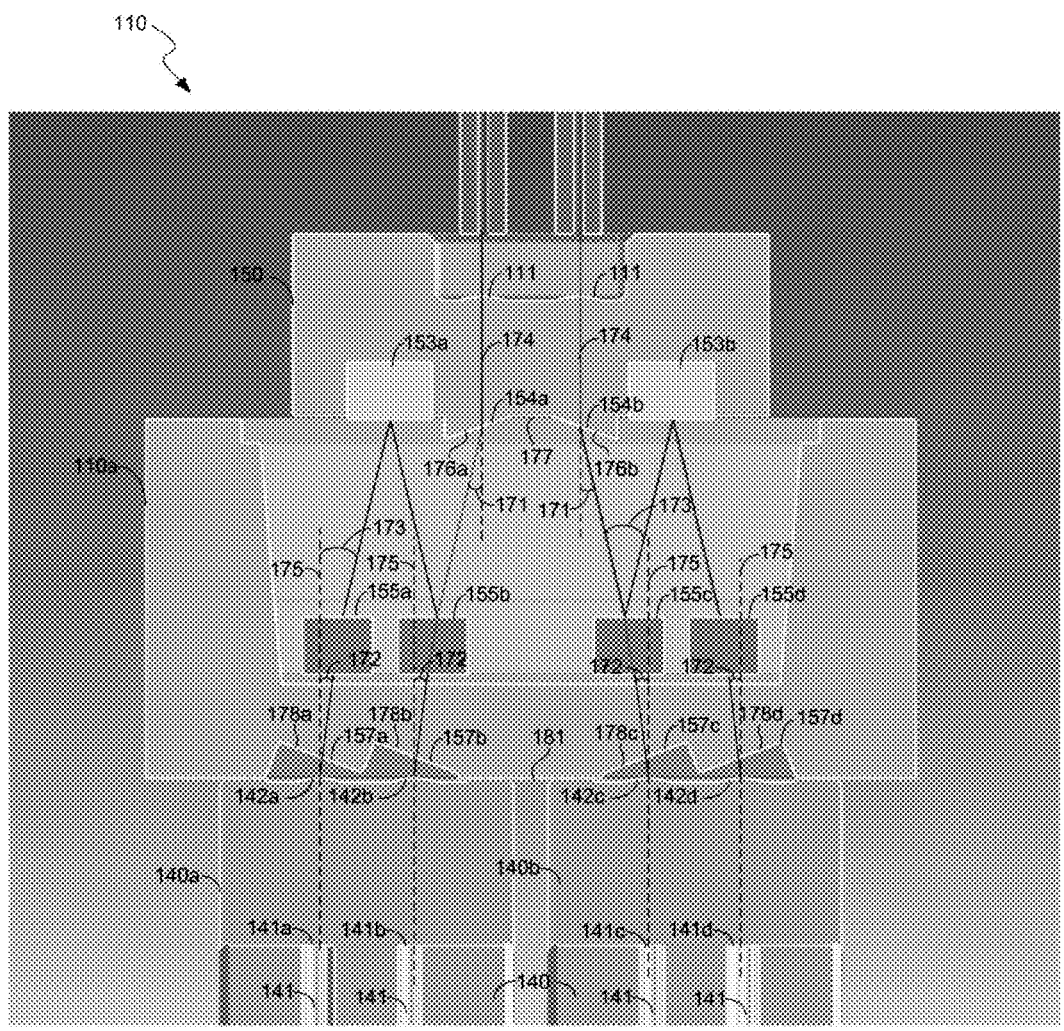
FIG. 5 illustrates a front cross-sectional perspective view of the assembled WDM module shown in FIG. 4 having the fiber assembly mated with a receptacle of the WDM module.

FIG. 5 illustrates a front cross-sectional perspective view of the assembled WDM module 110 shown in FIG. 4 having the fiber assembly 140 mated with the third receptacle 115 (FIG. 3A) of the WDM module 110. In FIG. 5, the first and second predetermined tilt angles 171 and 172, respectively, are shown with reference to optical axes 174 and 175 of the lenses 111 and the optical fibers 141, respectively. The first predetermined tilt angle, i.e., angle of refraction, provided by the first and second prism surfaces 154a and 154b, respectively, is about 33° relative to the optical axes 174 of the lenses 111 and relative to the optical axes 175 of the optical fibers 141 (the optical axes 174 and 175 are substantially parallel to one another). The second predetermined tilt angle provided by the third through sixth prism surfaces 157a-157d, respectively, is about 21°. The filter blocks 155a-155d further increase the tilt of the light beams provided by the prism surfaces 157a-157d by about 9° relative to the optical axes 175 of the fibers 141 to obtain a third tilt angle 173 of about 30° relative to the optical axes 175 of the optical fibers 141.

Thus, in the transmit direction, the light beams are incident on the first and second prism surfaces 154a an 154b, respectively, at angles of incidence of about 30° relative to the optical axes 174 and are tilted in the opposite direction by the first and second prism surfaces 154a and 154b, respectively, by the first predetermined tilt angle of about 30° such that the light beams strike the respective lenses 111 parallel to the optical axes 174 of the lenses 111. The surfaces 176a and 176b of the first and second prism surfaces 154a and 154b, respectively, are at a predetermined angle relative to an inner surface 177 of the module body 110a needed to achieve the first predetermined tilt angle. Likewise, the surfaces 178a and 178b of the third and fourth prism surfaces 157a and 157b, respectively, are at a predetermined angle relative to an inner surface 181 of the module body 110a needed to achieve the second predetermined tilt angle. Likewise, the surfaces 178c and 178d of the fifth and sixth prism surfaces 157c and 157d, respectively, are at a predetermined angle relative to an inner surface 181 of the module body 110a needed to achieve the second predetermined tilt angle.}

Yet another advantage of the in-line configuration described above with reference to FIGS. 1A-5 is that all of the light beams propagating in between the lenses 111 and the lenses 142a-142d are collimated light beams. Due to the larger diameter of a collimated light beam compared to the diameter of a focused light beam, the alignment tolerances between the components of the WDM module 110 are relaxed, which allows alignment between components or surfaces of the WDM module 110 to be more easily achieved.

Also, the module body 110a, the first and second optical connectors 140a and 140b, respectively, and the lens assembly 150 are typically made of a molded optical plastic material, such as, for example, Ultem™ polyetherimide, which is a product of Saudi Arabia Basic Industries Corporation (SABIC) of Saudi Arabia. Such molded plastic parts can be made very precisely using known plastic molding processes and systems. This further ensures precise optical alignment between features that are integrally formed in the module body 110a (e.g., the prism surfaces 157a-157d), in the fiber assembly 140 (e.g., the lenses 142a-142d) and in the lens assembly 150 (e.g., the lenses 111 and the prism surfaces 154a and 154b). The adapter 120 is typically also a molded plastic part, and therefore the first and second receptacles 101 and 102, respectively, are precisely molded features. This ensures that the mating of the MF connector 130 and the WDM module 110 with the first and second receptacles 101 and 102, respectively, of the adapter 120 (FIGS. 1A-2), the mating of the fiber assembly 140 with the third receptacle 115 (FIG. 3A) formed in the module body 110a, and the coupling of the lens assembly 150 with the module body 110a are accomplished with high precision, which further ensures precise optical alignment.

As indicated above, in known WDM systems that are used in high-volume and high channel density environments such as a switch box in a data center, for example, the WDM modules are typically separate from and interconnected to the optical transmitters, receivers or transceivers by one set of optical fiber cables and to respective MF connectors of a bulkhead by another set of optical cables. The WDM assembly 100 eliminates the need for multiple sets of optical cables by allowing the WDM modules to co-located with the MF connectors at the bulkhead through use of the adapters 120. Because each WDM module 110 is mechanically and optically coupled with a respective MF connector 130 inside of a respective adapter 120, the need for a set of optical fiber cables for interfacing the MF connectors with the respective WDM modules is eliminated, which reduces costs, conserves space and facilitates making the interconnections between the WDM modules and the MF connector. In addition, the compact nature of the WDM assembly design allows multiple WDM modules 110 to be inserted into a single bulkhead adaptor (not shown) that has a front receptacle that can that accept multiple MF connectors 130.

As indicated above, the number, P, of rows of optical fiber ends that are held in the MF connector 130, which also corresponds to the number of rows of lenses 111 that are disposed in the front end of the WDM module 110, can be as small as one. In cases where P=1, the row of optical fiber ends disposed in the MF connector is typically centered between the holes formed in the front end of the MF connector 130 that mate with the respective pins 112a and 112b of the WDM module 110. Similarly, the row of lenses 111 disposed in the front end of the WDM module 110 will be centered between the pins 112a and 112b. When the MF connector 130 and the WDM module 110 are mated with the first and second receptacles 101 and 102, respectively, of the adapter 120, the single row of lenses 111 of the WDM module 110 will be aligned with the single row of optical fiber ends held in the MF connector 130.

It should be noted that the inventive principles and concepts are not limited to the examples of dimensions, distances and angles given above with reference to the representative embodiments. The examples of dimensions, distances and angles given above are provided to demonstrate the manner in which one in-line, compact configuration of the WDM module 110 and assembly 100 can be achieved. Persons of skill in the art will understand, in view of the description provided herein, that a variety of modifications may be made to the representative embodiments described herein and that such modifications are within the scope of the inventive principles and concepts. For example, rather than the first and second pins 112a and 112b, respectively, being part of the WDM module 110 and the MF connector 130 having complementarily-shaped, size and positioned holes formed therein, the holes may be formed in the module body 110a and the pins 112a and 112b may be disposed on the MF connector. These and a variety of other modifications may be made within the scope of the inventive principles and concepts, as will be understood by those of skill in the art in view of the description provided herein.

What is claimed is:

1. A wavelength division multiplexing (WDM) assembly comprising:
an adapter having a front end and a back end, the adapter having first and second receptacles disposed in front and back ends thereof, respectively, the first receptacle being adapted to mate with a multi-fiber (MF) connector that holds ends of M optical fibers such that when the MF connector is mated with the first receptacle, the ends of the M optical fibers are disposed adjacent the second receptacle, where M is a positive integer that is greater than or equal to 1; and
a WDM module mated with the second receptacle of the adapter, the WDM module comprising:
a module body having a front end, a back end, a left side, a right side, a top side and a bottom side, the module body having ends of N optical fibers disposed therein, where N is equal to or greater than 2M; and
an optics system disposed in the module body in optical alignment with the ends of the N optical fibers, the optics system being configured to perform wavelength division multiplexing to multiplex N optical signals passing out of the ends of the N optical fibers, respectively, onto the ends of the M optical fibers disposed in the front end of the MF connector, the optics system including M lenses disposed in the front end of the module body adjacent the first receptacle, wherein when the MF connector is mated with the first receptacle, each of the M lenses is aligned with a respective end of one of the M optical fibers disposed in the front end of the MF connector.

2. The WDM assembly of claim 1, wherein the module body has one or more first passive alignment features thereon that are adapted to mate with one or more respective second passive alignment features of the MF connector when the MF connector is mated with the first receptacle.

3. The WDM assembly of claim 2, wherein the first receptacle has one or more passive alignment features therein that are adapted to engage one or more passive alignment features of the MF connector when the MF connector is mated with the first receptacle to align the MF connector with the adapter and to interlock the MF connector with the adapter.

4. The WDM assembly of claim 2, wherein the MF connector is a Multi-fiber Push-On (MPO) connector, and wherein said one or more respective second passive alignment features comprise first and second holes, and wherein said one or more first passive alignment features comprise first and second pins that are shaped, sized and positioned to mate with the first and second holes, respectively, when the MPO connector is mated with the first receptacle of the adapter.

5. The WDM assembly of claim 1, wherein the ends of the M optical fibers that are held in the MF connector are arranged in P substantially parallel rows of ends, where P is a positive integer that is greater than or equal to one, and wherein the ends of the N optical fibers that are disposed in the module body are arranged in Q substantially parallel rows of ends, where Q is a positive integer that is greater than or equal to 2P, and wherein the M lenses of the optics system are arranged in P substantially parallel rows of lenses, the optical signals passing out of the ends of the Q substantially parallel rows of ends having S respective wavelengths that are different from one another, where S is a positive integer that is greater than or equal to 2.

6. The WDM assembly of claim 5, further comprising:
a fiber assembly mechanically mated with a third receptacle formed in the back end of the module body, the fiber assembly holding said ends of N optical fibers in the module body.

7. The WDM assembly of claim 6, wherein the fiber assembly holds ends of the N optical fibers in Q substantially parallel rows of ends.

8. The WDM assembly of claim 7, wherein the fiber assembly comprises first and second optical connectors that are mechanically coupled to the third receptacle, each of the first and second optical connectors holding ends of M of the N optical fibers in first and second substantially parallel rows of ends.

9. The WDM assembly of claim 1, wherein the adapter has a length that is less than about 20 millimeters (mm).

10. The WDM assembly of claim 9, wherein the adapter has a width that is less than about 16 mm.

11. The WDM assembly of claim 10, wherein a distance from the lenses disposed in the front end of the WDM module and the ends of the N optical fibers disposed in the module body in a direction parallel to optical axes of the N optical fiber ends is less than about 3 mm.

12. A wavelength division demultiplexing (WDM) assembly comprising:
an adapter having a front end and a back end, the adapter having first and second receptacles disposed in front and back ends thereof, respectively, the first receptacle being adapted to mate with a multi-fiber (MF) connector that holds ends of M optical fibers such that when the MF connector is mated with the first receptacle, the ends of the M optical fibers are disposed adjacent the second receptacle, where M is a positive integer that is greater than or equal to 1; and
a WDM module mated with the second receptacle of the adapter, the WDM module comprising:
a module body having a front end, a back end, a left side, a right side, a top side and a bottom side, the module body having ends of N optical fibers disposed therein, where N is equal to or greater than 2M; and
an optics system disposed in the module body in optical alignment with the ends of the N optical fibers, the optics system being configured to perform wavelength division demultiplexing to demultiplex M optical signals passing out of the ends of the M optical fibers, respectively, held in the MF connector onto the ends of the N optical fibers disposed in the WDM module, the optics system including M lenses disposed in the front end of the module body adjacent the first receptacle, wherein when the MF connector is mated with the first receptacle, each of the M lenses is aligned with a respective end of one of the M optical fibers held in the MF connector.

13. The WDM assembly of claim 12, wherein the module body has one or more first passive alignment features thereon that are adapted to mate with one or more respective second passive alignment features of the MF connector when the MF connector is mated with the first receptacle.

14. The WDM assembly of claim 13, wherein the first receptacle has one or more passive alignment features therein that are adapted to engage one or more passive alignment features of the MF connector when the MF connector is mated with the first receptacle to align the MF connector with the adapter and to interlock the MF connector with the adapter.

15. The WDM assembly of claim 13, wherein the MF connector is a Multi-fiber Push-On (MPO) connector, and wherein said one or more respective second passive alignment features comprise first and second holes, and wherein said one or more first passive alignment features comprise first and second pins that are shaped, sized and positioned to mate with the first and second holes, respectively, when the MPO connector is mated with the first receptacle of the adapter.

16. The WDM assembly of claim 12, wherein the ends of the M optical fibers that are held in the MF connector are arranged in P substantially parallel rows of ends, where P is a positive integer that is greater than or equal to one, and wherein the ends of the N optical fibers that are disposed in the module body are arranged in Q substantially parallel rows of ends, where Q is a positive integer that is greater than or equal to 2P, and wherein the M lenses of the optics system are arranged in P substantially parallel rows of lenses, the optical signals passing out of the ends of the P substantially parallel rows of ends having S respective wavelengths that are different from one another, where S is a positive integer that is greater than or equal to 2.

17. The WDM assembly of claim 16, further comprising:
a fiber assembly mechanically mated with a third receptacle formed in the back end of the module body, the fiber assembly holding said ends of N optical fibers in the module body.

18. The WDM assembly of claim 17, wherein the fiber assembly holds ends of the N optical fibers in Q substantially parallel rows of ends.

19. The WDM assembly of claim 18, wherein the fiber assembly comprises first and second optical connectors that are mechanically coupled to the third receptacle, each of the first and second optical connectors holding ends of M of the N optical fibers in first and second substantially parallel rows of ends.

20. The WDM assembly of claim 12, wherein the adapter has a length that is less than about 20 millimeters (mm).

21. The WDM assembly of claim 20, wherein the adapter has a width that is less than about 16 mm.

22. The WDM assembly of claim 21, wherein a distance from the lenses disposed in the front end of the WDM module and the ends of the N optical fibers disposed in the module body in a direction parallel to optical axes of the N optical fiber ends is less than about 3 mm.

23. A wavelength division multiplexing and demultiplexing (WDM) assembly that is also capable of performing bidirectional communications, the WDM assembly comprising:

an adapter having a front end and a back end, the adapter having first and second receptacles disposed in front and back ends thereof, respectively, the first receptacle being adapted to mate with a multi-fiber (MF) connector that holds ends of M optical fibers such that when the MF connector is mated with the first receptacle, the ends of the M optical fibers are disposed adjacent the second receptacle, where M is a positive integer that is greater than or equal to 1; and a WDM module mated with the second receptacle of the adapter, the WDM module comprising:

a module body having a front end, a back end, a left side, a right side, a top side and a bottom side, the module body having ends of N optical fibers disposed therein, where N is equal to or greater than 2M; and an optics system disposed in the module body in optical alignment with the ends of the N optical fibers, the optics system being configured to perform one or more of wavelength division multiplexing, wavelength division demultiplexing and bidirectional communications, the optics system including M lenses disposed in the front end of the module body adjacent the first receptacle, wherein when the MF connector is mated with the first receptacle, each of the M lenses is aligned with a respective end of one of the M optical fibers held in the MF connector.

* * * * *